(12) United States Patent
Chun et al.

(10) Patent No.: US 9,001,761 B2
(45) Date of Patent: Apr. 7, 2015

(54) METHOD OF TRANSMITTING AND RECEIVING SIGNAL IN A DISTRIBUTED ANTENNA SYSTEM

(75) Inventors: Jin Young Chun, Anyang-si (KR); Ji Won Kang, Anyang-si (KR); Sung Ho Park, Anyang-si (KR); Su Nam Kim, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 277 days.

(21) Appl. No.: 13/638,747

(22) PCT Filed: Apr. 6, 2011

(86) PCT No.: PCT/KR2011/002416
§ 371 (c)(1),
(2), (4) Date: Oct. 1, 2012

(87) PCT Pub. No.: WO2011/126304
PCT Pub. Date: Oct. 13, 2011

(65) Prior Publication Data
US 2013/0028194 A1    Jan. 31, 2013

(30) Foreign Application Priority Data
Apr. 7, 2010 (KR) .................. 10-2010-0031757

(51) Int. Cl.
*H04W 4/00* (2009.01)
*H04B 7/02* (2006.01)
*H04W 48/12* (2009.01)
*H04L 27/26* (2006.01)
*H04W 88/08* (2009.01)

(52) U.S. Cl.
CPC ............ *H04B 7/024* (2013.01); *H04L 27/2601* (2013.01); *H04W 48/12* (2013.01); *H04W 88/085* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

| | | | |
|---|---|---|---|
| 5,953,325 A * | 9/1999 | Willars | 370/335 |
| 2008/0150514 A1 * | 6/2008 | Codreanu et al. | 324/76.77 |
| 2008/0212969 A1 | 9/2008 | Fasshauer et al. | |
| 2008/0248805 A1 | 10/2008 | Han et al. | |
| 2009/0191891 A1 | 7/2009 | Ma et al. | |
| 2009/0316641 A1 * | 12/2009 | Yamada et al. | 370/329 |
| 2010/0040006 A1 | 2/2010 | Caire | |
| 2010/0041407 A1 * | 2/2010 | Caire et al. | 455/446 |

* cited by examiner

*Primary Examiner* — Ronald Abelson
(74) *Attorney, Agent, or Firm* — McKenna Long & Aldridge LLP

(57) ABSTRACT

A method of transmitting a signal from a base station to a user equipment in a distributed antenna system (DAS) comprises equally broadcasting DA common broadcast information, which includes information required for initial access, into a cell through a plurality of DA groups of the base station; and independently broadcasting DA specific broadcast information, which includes information on the number of antennas of each DA group, through each DA group of the base station, wherein the DA group includes one or more DAs.

12 Claims, 8 Drawing Sheets

[Fig. 1]
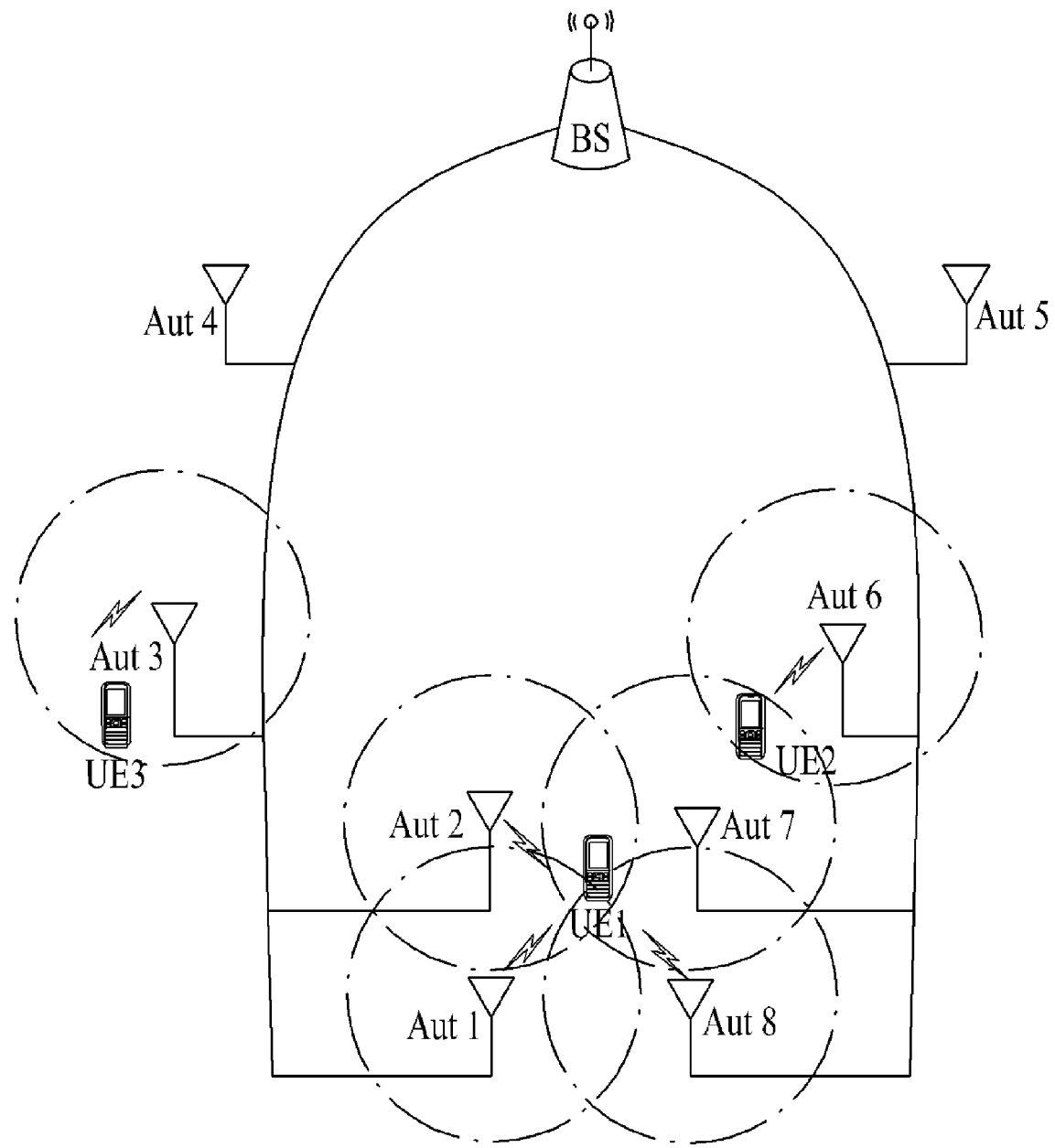

[Fig. 2]
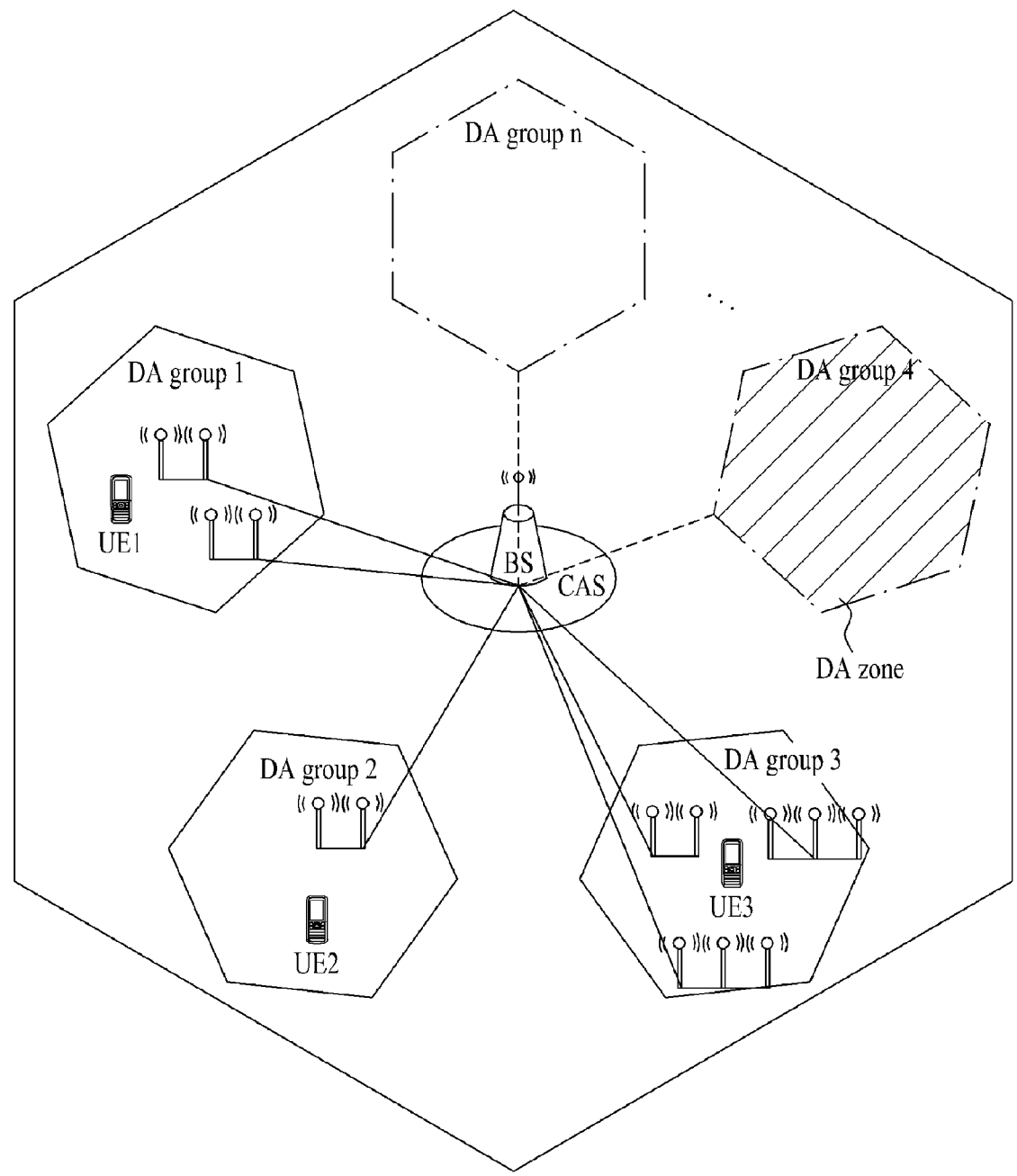

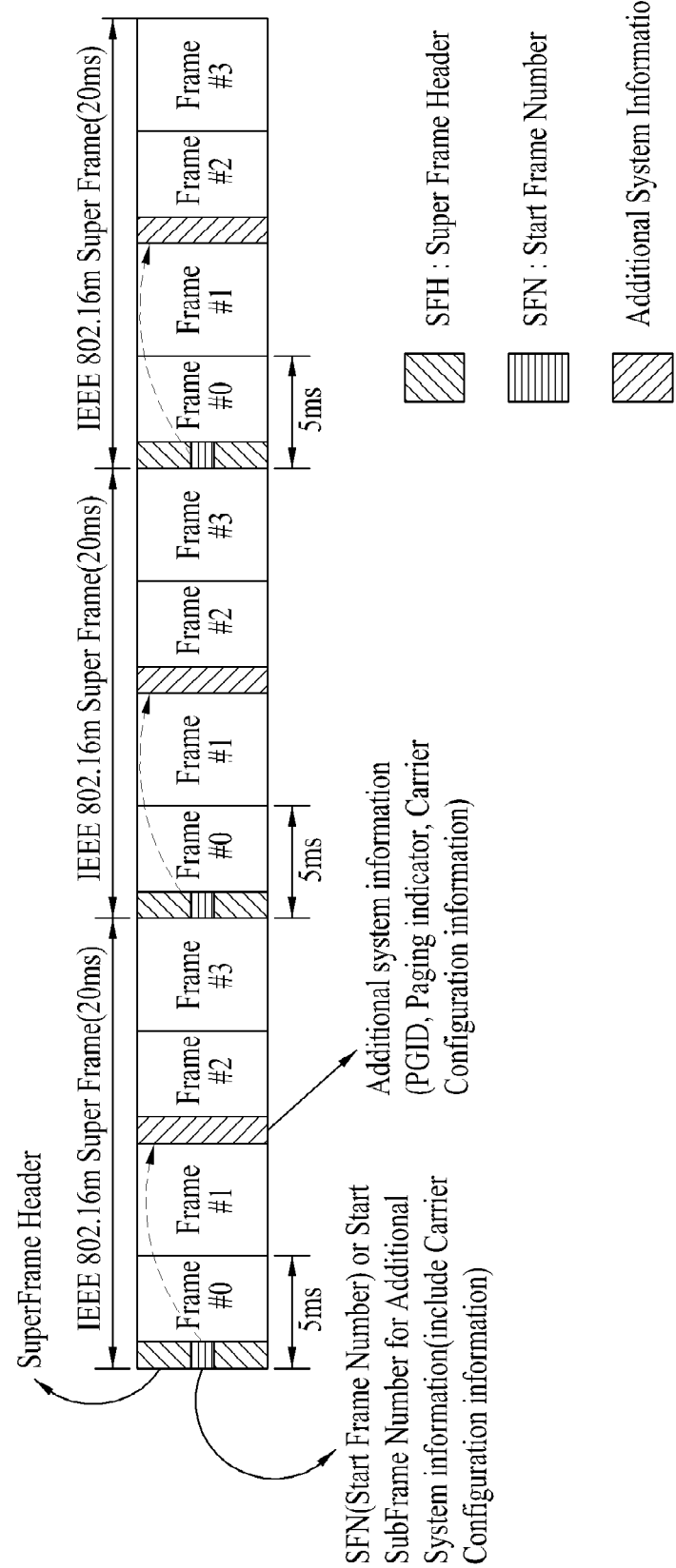
[Fig. 3]

[Fig. 4]
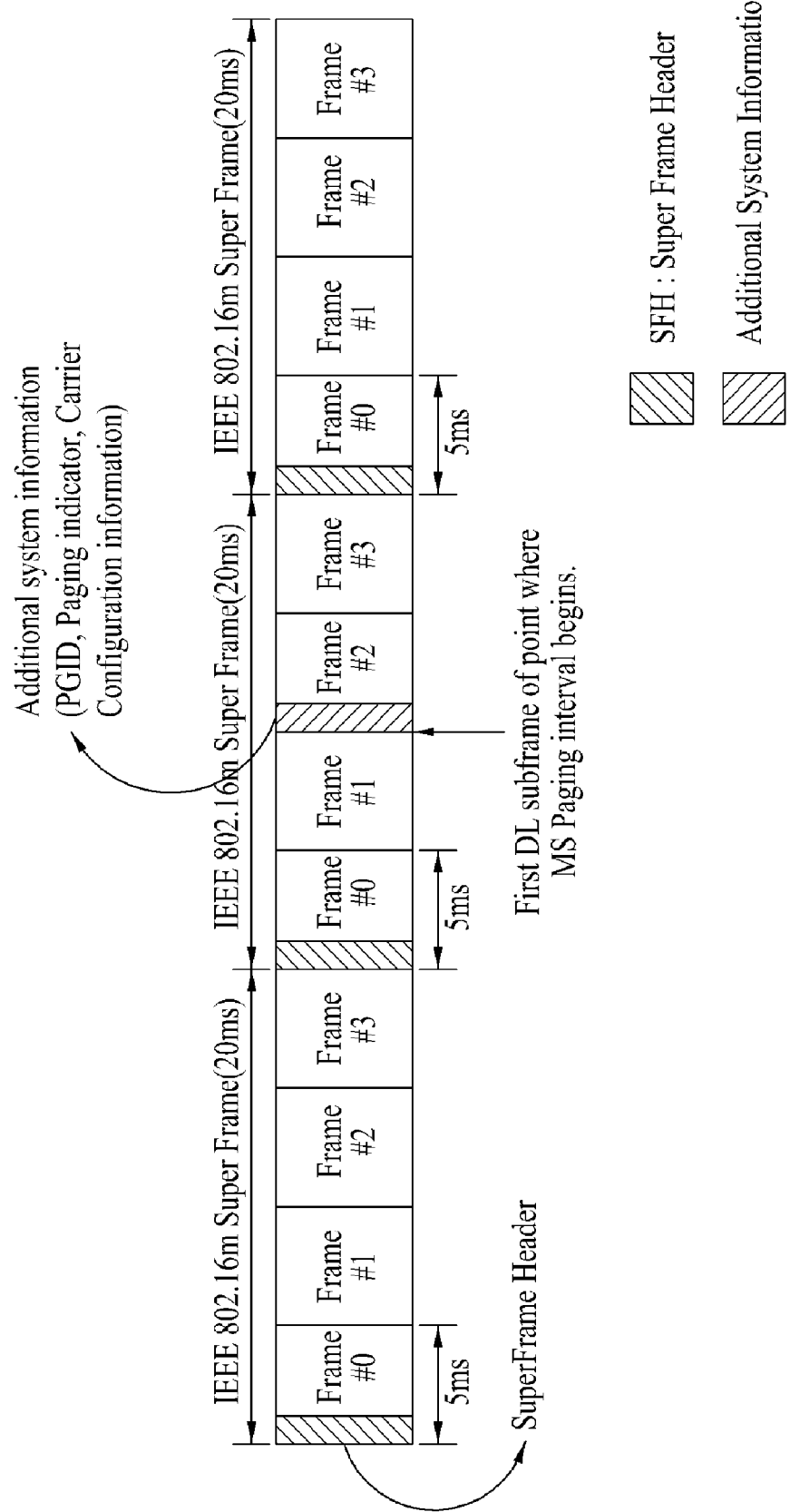

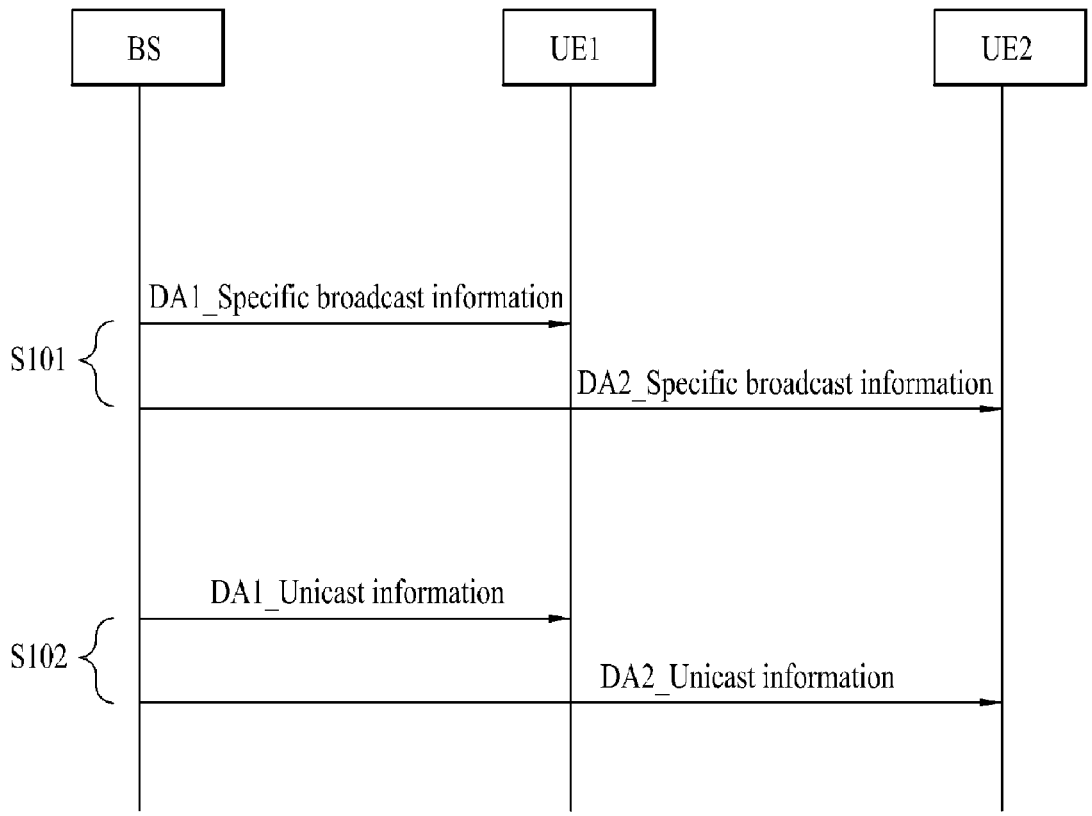
[Fig. 5]
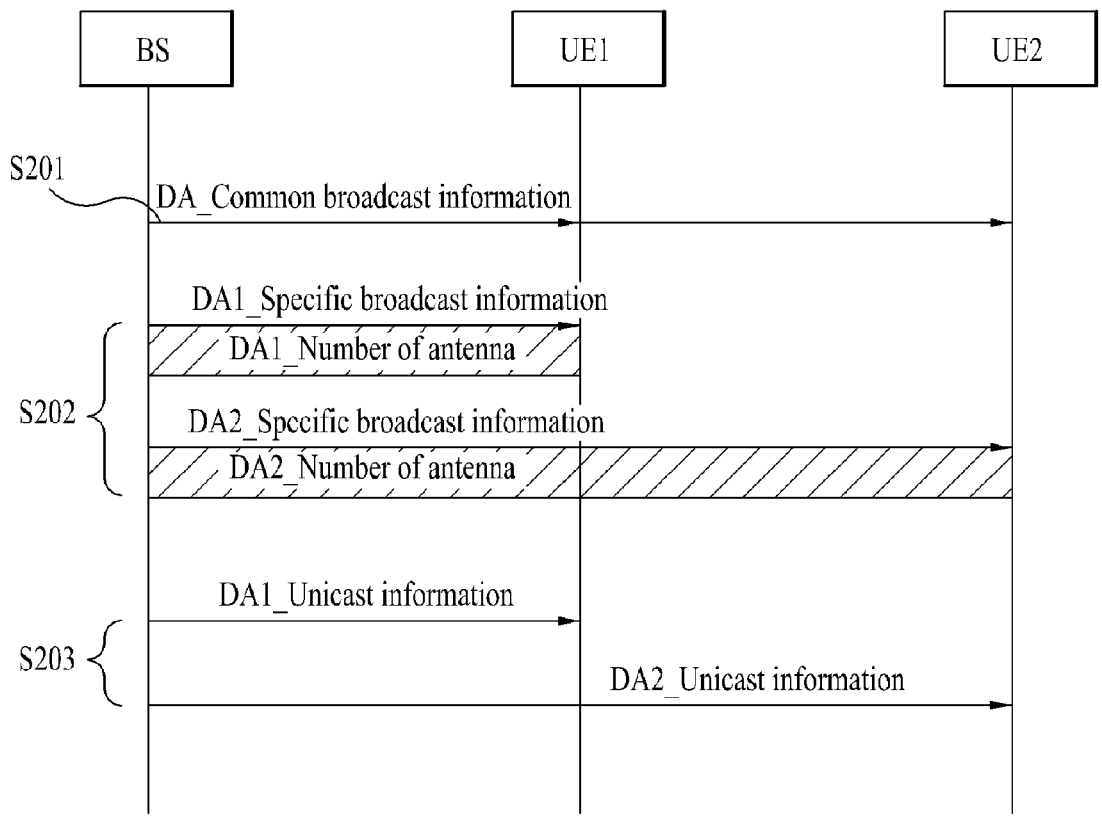
[Fig. 6]

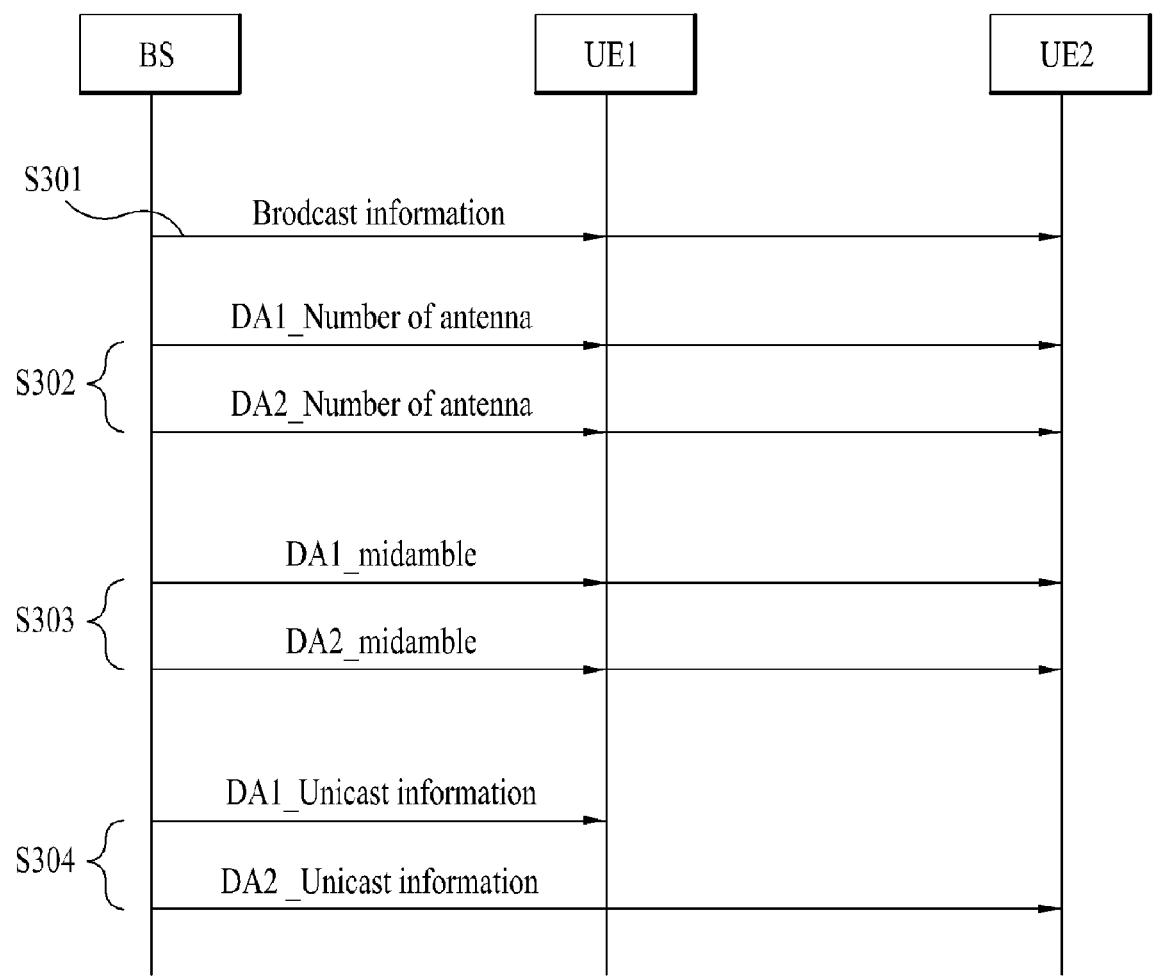

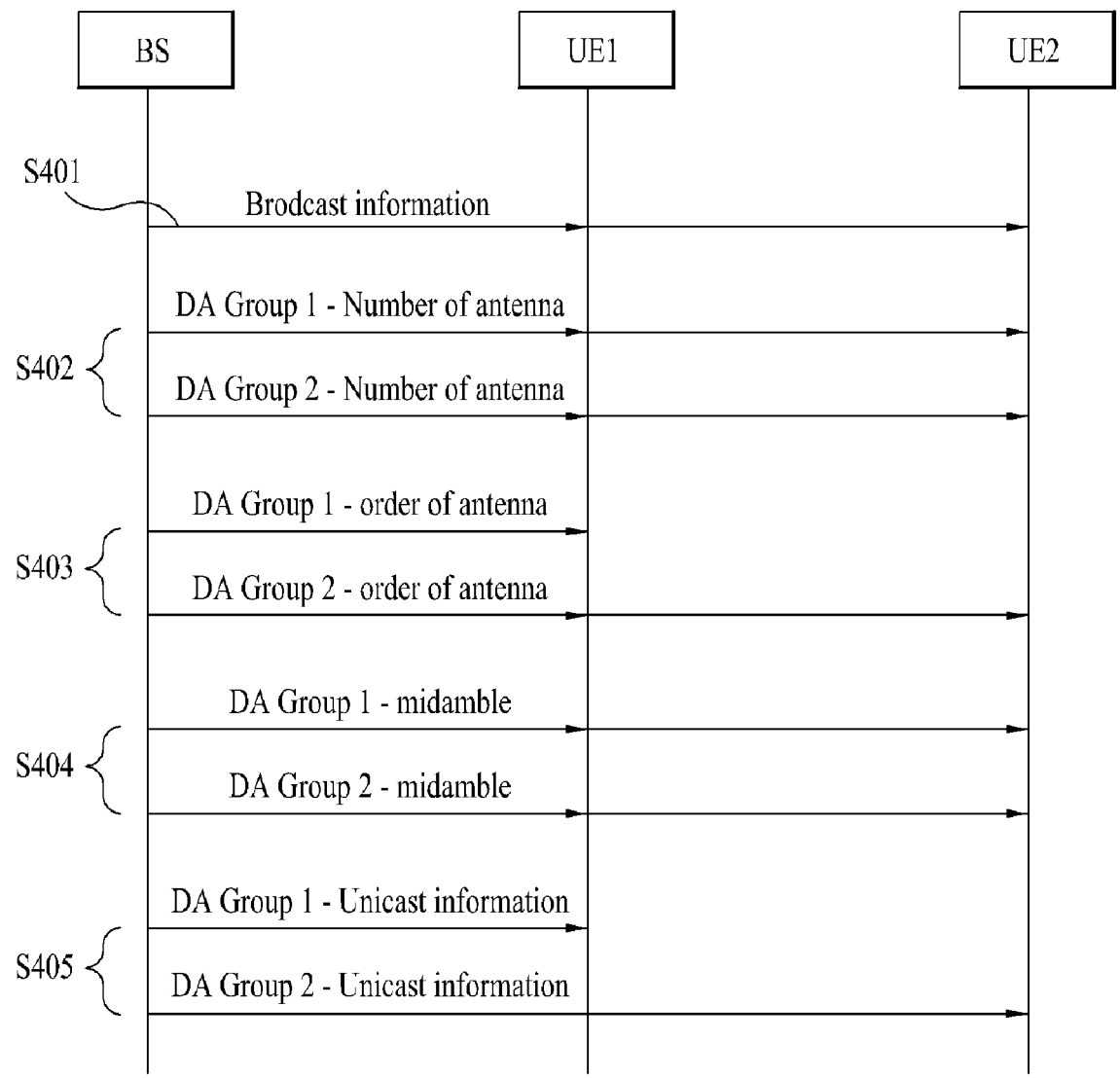

[Fig. 9]
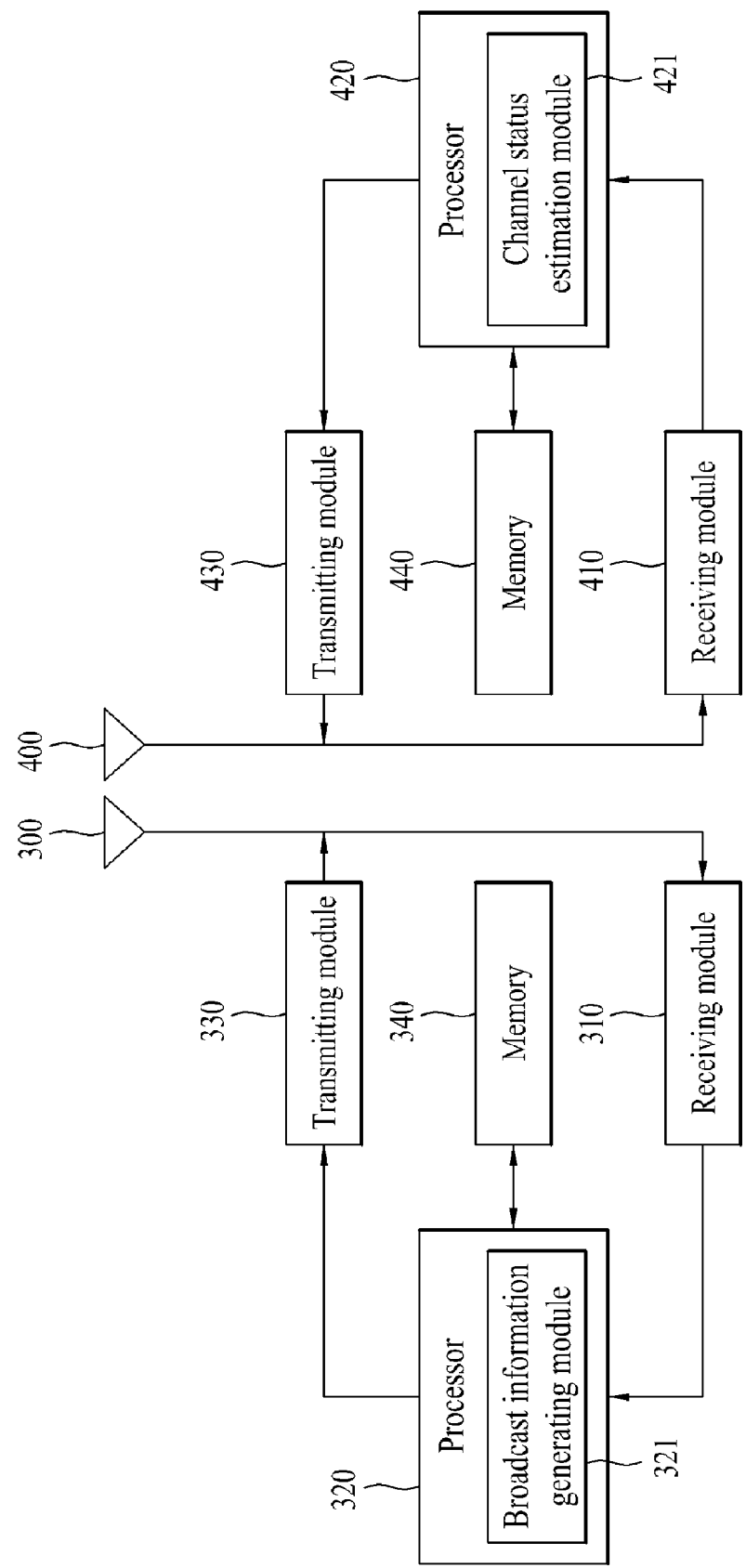

METHOD OF TRANSMITTING AND RECEIVING SIGNAL IN A DISTRIBUTED ANTENNA SYSTEM

This Application is a 35 U.S.C. §371 National Stage Entry of International Application No. PCT/KR2011/002146, filed Apr. 6, 2011 and claims the benefit of Korean Application No: 10-2010-0031757, filed Apr. 7, 2010, all of which are incorporated by reference in their entirety herein.

TECHNICAL FIELD

The present invention relates to a method of transmitting and receiving a signal in a multi-node system (e.g., DAS), and more particularly, to a method of transmitting broadcast information and unicast information from nodes of a multi-node system.

BACKGROUND ART

The multi-node system uses a plurality of nodes each of which may represent a base station, an access point, an antenna, an antenna group or a radio remote header (RRH). The plurality of nodes may be managed by one base station/base station controller which control and schedule the nodes' operation.

Distributed nodes connected with a single base station/base station controller through a cable or a dedicated line, wherein the single base station/base station controller manages a plurality of nodes located within a cell at predetermined intervals. This multi-node system may be regarded as a multiple input multiple output (MIMO) system in that distributed nodes can support a single user equipment or multiple user equipments by transmitting and receiving different data streams at the same time. In view of the MIMO system, the multi-node system is advantageous in that it can reduce a transmission power as a transmission zone is more reduced than that of the CAS due to nodes distributed at various locations within a certain geographical area. Also, the multi-node system can reduce path loss by reducing a transmission distance between a node and a user equipment, thereby enabling high rate transmission of data. As a result, the multi-node system can enhance transmission capacity and power efficiency of the cellular system, and can satisfy communication throughput of quality more relatively uniform than that of the CAS regardless of user location within the certain geographical area. Also, since the base station/base station controller(s) connected with a plurality of distributed nodes cooperates in the multi-node system, signal loss is reduced, and correlation and interference between the antennas are reduced, whereby a high signal to interference to noise ratio (SINR) can be obtained.

As described above, in order to reduce facility costs of the base station and maintenance costs of a backbone network in a next generation mobile communication system and at the same time extend service coverage and improve channel capacity and SINR, the multi-node system can be a new basis of cellular communication by being compatible with the existing CAS or replacing with the CAS.

DISCLOSURE OF INVENTION

Technical Problem

Based on the aforementioned discussion, an object of the present invention is to provide a method of performing communication considering a base station and a user equipment, which support a multi-node system, without affecting a user equipment operated in a conventional mobile communication system such as a CAS.

Another object of the present invention is to provide a method of performing communication using a subframe, where a user equipment does not perform any operation like a relay zone, as a multi-node system zone in a frame structure used for a relay function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method of transmitting a signal from a base station to a user equipment in a distributed antenna system (DAS) comprises equally broadcasting DA common broadcast information, which includes information required for initial access, into a cell through a plurality of DA groups of the base station; and independently broadcasting DA specific broadcast information, which includes information on the number of antennas of each DA group, through each DA group of the base station, wherein the DA group includes one or more DAs.

The DA specific broadcast information includes a list of information on the number of antennas of DA group, which includes all kinds of information on the number of antennas, dedicated for each of the DA groups.

The method further comprises identifying a specific DA group associated with the user equipment; and transmitting a signal to the user equipment through the specific DA group by using the information on the number of antennas broadcasted to the specific DA group. Moreover, the method further comprises transmitting information on the order of DAs of the specific DA group or antennas to the user equipment.

The method further comprises broadcasting midamble used for channel estimation through each of the plurality of DA groups, wherein the midamble is configured for each of the DA groups by considering the number of antennas of the DA group. Moreover, the method further comprises receiving information on the result of channel estimation for the specific DA group associated with the user equipment, from the user equipment.

In another aspect of the present invention, a method of receiving a signal in a user equipment from a base station in a distributed antenna system (DAS) comprises receiving DA common broadcast information, which includes information required for initial access, from the base station that includes a plurality of DA groups; and receiving DA specific broadcast information, which includes information on the number of antennas used for downlink transmission in a specific DA group associated with the user equipment, from the base station, wherein the DA group includes one or more DAs.

The DA specific broadcast information includes a list of information on the number of antennas of DA group, which includes all kinds of information on the number of antennas, dedicated for each of the DA groups.

The method further comprises receiving information on the order of DAs of the specific DA group or antennas from the base station.

The method further comprises receiving midamble configured based on the information on the number of antennas of the specific DA group, from the base station; and performing channel estimation by using the midamble. Moreover, the method further comprises transmitting the result of channel estimation for the specific DA group to the base station.

In still another aspect of the present invention, a base station of a distributed antenna system (DAS) comprises a plurality of DA groups that include one or more distributed antennas (DAs); a processor respectively generating DA common broadcast information, which includes information required for initial access, and DA specific broadcast information, which includes information on the number of antennas used for downlink transmission in each DA group, equally broadcasting the DA common broadcast information into a cell through the plurality of DA groups, and independently broadcasting the DA specific broadcast information through each DA group; and a transmitting module broadcasting the DA common broadcast information and the DA specific broadcast information.

The processor configures midamble used for channel estimation for each of the DA groups by considering the number of antennas of the DA group, and the base station further comprises a receiving module receiving the result of channel estimation for the specific DA group associated with the user equipment, from the user equipment belonging to the DAS, when the processor broadcasts the midamble through each DA group.

In further still another aspect of the present invention, a user equipment of a distributed antenna system (DAS) comprises a receiving module receiving DA common broadcast information, which includes information required for initial access, and DA specific broadcast information, which includes information on the number of antennas used for downlink transmission in a specific DA group associated with the user equipment, from a base station that includes a plurality of distributed antennas (DAs); and a processor performing channel estimation by using midamble of the specific DA group associated with the user equipment, the midamble being received through the receiving module, wherein the DA group includes one or more DAs.

The user equipment further comprises a transmitting module transmitting the result of channel estimation for the specific DA group to the base station.

The aforementioned embodiments are only a part of the preferred embodiments of the present invention, and various embodiments reflecting technical features of the present invention will be understood by the person with ordinary skill in the art based on the detailed description of the present invention.

Advantageous Effects of Invention

According to the embodiments of the present invention, the base station in the multi-node system (for example, DAS) can configure broadcast information independently from a plurality of antennas for a multi-node system or configure all or some of broadcast information to be shared by the antennas for the multi-node system.

Also, according to the embodiments of the present invention, the base station can configure various kinds of information on the number of antennas used for communication with a corresponding user equipment and include the configured information in broadcast information.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating an example of a DAS structure to which the present invention is applied;

FIG. 2 is a diagram illustrating another example of a DAS structure to which the present invention is applied;

FIG. 3 is a diagram illustrating an example of a frame structure used in an IEEE 802.16m system;

FIG. 4 is a diagram illustrating a superframe based on a duplex mode used in an IEEE 802.16m system;

FIG. 5 is a diagram illustrating an example of a procedure of performing communication between a base station and a user equipment in a DAS according to one embodiment of the present invention;

FIG. 6 is a diagram illustrating another example of a procedure of performing communication between a base station and a user equipment in a DAS according to one embodiment of the present invention;

FIG. 7 is a diagram illustrating still another example of a procedure of performing communication between a base station and a user equipment in a DAS according to one embodiment of the present invention;

FIG. 8 is a diagram illustrating further still another example of a procedure of performing communication between a base station and a user equipment in a DAS according to one embodiment of the present invention; and FIG. 9 is a block diagram illustrating a user equipment and a base station (FBS, MBS), in which the embodiments of the present invention can be carried out, in accordance with another embodiment of the present invention.

MODE FOR THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on an institute electrical and electronics engineers (IEEE) 802.16 system, the following description can be applied to various wireless communication systems, such as a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile station (MS), or a mobile or fixed type user terminal device. Also, it is assumed that a base station will refer to a random node of a network terminal that performs communication with a user equipment, such as Node B (NB), eNode B (eNB), and processing server (PS).

The present invention can be applied to various types of multi-node systems. For example, embodiments of the present invention can be applied to the multi-node system such as a distribute antenna system (DAS), macro-node with low-power RRHs, a multi-base station cooperative system, a femto-/pico-cell cooperative system, a combination thereof and etc. One or more base stations connected to the plurality of nodes in the multi-node system can cooperate to simultaneously transmit/receive a signal to/from a user equipment.

The DAS uses a plurality of distributed antennas connected with a single base station/base station controller through a cable or a dedicated line, wherein the single base station/base station controller manages a plurality of antennas located at predetermined interval within a certain geographical region (also called a cell) managed by the single base station/base station controller. Each antenna and/or each antenna group in the DAS can be a node of the multi-node system of the present invention, and each node of the DAS operates as a subset of antennas equipped in the single base station. The DAS is a kind of multi-node system, and the distributed antenna or antenna group in DAS is a kind of node in multi-node system. The DAS provided with a plurality of antennas located within a cell at predetermined intervals is different from a centralized antenna system (CAS) provided with a plurality of antennas centralized at the center of a cell. The DAS is different from a femto cell in that all distributed antennas located within a cell are managed by a base station/base station controller at the center of the cell not each unit of the distributed antennas. Also, the DAS is different from a multi-hop relay system or ad-hoc network in that distributed antenna units are connected with one another through a cable or a dedicated line, wherein the multi-hop relay system or ad-hoc network include a base station connected with a relay station (RS) through a wireless mode. Moreover, the DAS is different from a repeater, which simply amplifies and transmits a signal, in that each of distributed antennas can transmit different signals to different user equipments located near the antennas in accordance with a command of a base station/base station controller.

Each node of the multi-base station cooperative system, or the femto-cell or pico-cell cooperative system operates as an independent base station and cooperates with each other. Each base station of the multi-base station cooperative system or the femto-/pico-cell cooperative system can be a node in the multi-node system of the present invention. The multiple nodes of the multi-base station cooperative system, or the femto-cell or the pico-cell cooperative system are connected with one another via a backbone network and the like, and perform cooperative transmission/reception by performing scheduling and/or handover together.

Although there are differences among the DAS, macro-node with low-power RRHs, the multi-base station cooperative system, the femto-/the pico-cell cooperative system, and etc, embodiments of the present invention can be applied to them all since they are different from a single-node system (e.g., a CAS, a conventional MIMO system, a conventional relay system, a conventional repeater system, and etc.) and a plurality of nodes of them participate in providing communication service for a user equipment in cooperative manner. Hereinafter, for the convenience's sake of description, the present invention will be described, taking an example of the DAS. However, the following description is only an exemplary, and the present invention is also applicable to other multi-node system in the same manner since an antenna or an antenna group of the DAS can be corresponding to a node of other multi-node system and a single base station of the DAS can be corresponding to one or more cooperative base stations of other multi-node system.

FIG. 1 is a diagram illustrating an example of a DAS structure to which the present invention is applied.

The base station illustrated in FIG. 1 may include a plurality of antennas located at the center of a cell in accordance with a CAS. For conciseness of description, however, DAS antennas are only illustrated in FIG. 1. In a DAS, a plurality of antennas connected with a single base station, which is located within a cell, through a cable are distributed at various locations within the cell. This DAS can be configured in various manners depending on the number and location of antennas. For example, a plurality of antennas may be distributed within the cell at constant intervals or two or more antennas may be centralized at a specific place. If coverage of each of the distributed antennas is overlapped with that of another distributed antenna, signal transmission of rank 2 or more can be performed in the DAS regardless of the location of the distributed antennas within the cell. Rank means the number of data streams that can be transmitted at the same time through one or more antennas.

Referring to FIG. 1, one base station that provides communication service to one cell zone is connected with a total of eight antennas through a cable, wherein the respective antennas are located at constant intervals or various intervals within the cell. In the DAS, all the antennas connected with the base station are not needed to be used, and a proper number of antennas can be used based on their signal transmission range, an overlap level of coverage and interference with their neighboring antenna, and the distance with the user equipment. For example, if three user equipments (UE 1 to UE 3) are located within the cell and UE 1 is located within a signal transmission range of the antennas 1, 2, 7 and 8 as illustrated in FIG. 1, the UE 1 can receive a signal from one or more of the antennas 1, 2, 7 and 8 of the base station. On the other hand, in view of the UE 1, it is likely that high path loss may occur in signals transmitted from the antennas 3, 4, 5 and 6 and power consumption may be increased therein due to a long distance between the corresponding antennas and the user equipment UE 1. It is likely that the signals transmitted from the antennas 3, 4, 5 and 6 may have small intensity that may be disregarded. For another example, since the UE 2 is located in a portion where the signal transmission range of the antenna 6 is overlapped with that of the antenna 7, the signals transmitted through the other antennas except for the antennas 6 and 7 may be small or weak values that may be disregarded. Also, since the UE 3 is located within a neighboring distance of the antenna 3, it can exclusively receive the signal transmitted through the antenna 3.

As illustrated in FIG. 1, if a plurality of antennas are spaced apart from one another within the cell of the DAS, the DAS is operated like a MIMO system. The base station can perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may transmit various numbers of data streams for each user equipment during communication with a single user/multiple users. Also, various antennas or antenna groups may be allocated to user equipments located within the cell supported by the base station in the DAS. A specific antenna or antenna group, which performs communication with a user equipment, may be defined depending on the location of the corresponding user equipment located within the cell. Alternatively, the antenna or antenna group, which performs communication with a user equipment, may adaptively be changed depending on movement of the user equipment within the cell.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone. The DAs are configured by one or more antennas connected to the base station through one cable. The one or more DAs form one DA group, thereby forming a DA zone. The one or more DAs forming one DA group can correspond to a node in the multi-node system.

The DA group, which includes one or more DAs, may variably be configured depending on the location or receiving status of the user equipment, or may fixedly configured (by the number of maximum antennas used in MIMO). According to the IEEE 802.16m, the number of maximum antennas is 8Tx. The DA zone is defined by the range that the antennas constituting the DA group can transmit or receive a signal. The cell zone illustrated in FIG. 2 includes n number of DA zones. The user equipment that belongs to the DA zone can perform communication with one or more the DAs constituting the DA zone, and the base station can increase a transmission rate by using the DAs and the CAs at the same time during signal transmission to the user equipment belonging to the DA zone.

A CAS that includes a DAS is illustrated in FIG. 2, whereby the base station and the user equipment can use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

FIG. 3 is a diagram illustrating an example of a frame structure used in an IEEE 802.16m system, and FIG. 4 is a diagram illustrating a superframe based on a duplex mode used in an IEEE 802.16m system.

Referring to FIG. 3, a radio frame includes superframes SU0 to SU3 of 20 ms that support a bandwidth, for example, 5 MHz, 8.75 MHz, 10 MHz or 20 MHz. Each superframe includes four frames F0 to F3 of 5 ms having the same size, and starts with a super frame header (SFH). The super frame header can be located within the first subframe as illustrated in FIG. 3, and is used to transmit essential system parameter and system configuration information. In more detail, the super frame header includes a primary super frame header (P-SFH) and a secondary super frame header (S-SFH). The P-SFH can be transmitted per superframe, and the S-SFH can be transmitted per frame. Also, the super frame header can include a physical broadcast channel through which general broadcast information or advanced broadcast information (ABI) is broadcasted. The user equipment synchronized with the base station can acquire broadcast information within the cell by receiving the physical broadcast channel.

In the IEEE 802.16m system, a downlink synchronization channel includes a primary-synchronized channel (P-SCH) and a secondary-synchronized channel (S-SCH), through which a primary advanced preamble (PA-preamble) and a secondary advanced preamble (SA-preamble) are transmitted. The PA-preamble or the SA-preamble may be transmitted through the first OFDM symbol of each frame. The PA-preamble may be used to acquire time/frequency synchronization, segment cell identifier, information such as system information, and a channel bandwidth used in the system. The SA-preamble may be used to acquire a final physical cell identifier such as cell ID or segment identifier, and may further be used for measurement of received signal strength indication (RSSI). Accordingly, the user equipment performs initial cell search such as synchronizing with the base station when it newly enters a cell or the power is turned on. To this end, the user equipment synchronizes with the base station by receiving the P-SCH and the S-SCH from the base station, and acquires information of cell ID, etc.

The frame structure can be applied to a frequency division duplex (FDD) mode, a half frequency division duplex (H-FDD) mode, a time division duplex (TDD) mode, etc. Referring to FIG. 4, since downlink transmission and uplink transmission are identified by frequency in the FDD mode, one frame includes either downlink subframes (D) or uplink subframes (U). In the FDD mode, an idle time can exist at the end of each frame. On the other hand, since downlink transmission and uplink transmission are identified by time in the TDD mode, subframes within the frame are classified into a downlink subframe (D) and an uplink subframe (U). An idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

Referring to FIG. 3 again, each subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDM symbols included in one subframe can be varied within the range of 5 to 7 depending on channel bandwidth and CP length. A type of the subframe can be defined depending on the number of OFDM symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes.

Each of OFDMA symbols constituting the subframes includes a plurality of subcarriers, and the number of subcarriers is determined depending on the size of fast Fourier transform (FFT). The subcarriers can be classified into data subcarriers for data transmission, pilot subcarriers for channel measurement, and channel subcarriers for guard band and DC components. Examples of parameters for the OFDM symbols include BW, $N_{used}$, n, G, etc. The BW is a nominal channel bandwidth, and $N_{used}$ is the number of subcarriers used for signal transmission. Also, n is a sampling factor, and determines subcarrier spacing and useful symbol time together with BW and $N_{used}$. G is a ratio between CP time and useful time.

The aforementioned structure described with reference to FIG. 3 and FIG. 4 is only exemplary. Accordingly, various modifications can be made in the length of the superframe, the number of frames included in the superframe, the number of subframes included in the frame, the number of OFDMA symbols included in the subframe, and parameters of OFDMA symbols. For example, the number of subframes included in the frame can be varied depending on the channel bandwidth and the CP length.

The base station according to one embodiment of the present invention can enter the DA zone by using the frame structure illustrated in FIG. 3 and FIG. 4 or can perform communication with the user equipment of which power is turned on in the DA zone. As described above, for initial cell search, the user equipment can synchronize with the base station by receiving the SCH, and can acquire system information, etc. The user equipment synchronized with the base station can perform a random access procedure if it initially accesses the base station, or if there is no radio resource for signal transmission. To this end, the user equipment can transmit a specific sequence to the base station through a random channel. For example, if the user equipment transmits an initial ranging signal to the base station, the base station can allocate a specific DA for communication with the user equipment based on a receiving rate or receiving power of the DAs that have received the initial ranging signal. Even after the user equipment-specific DA is determined, it is determined that the signal received through the corresponding DA is less or more than a predetermined threshold value depending on movement of the user equipment, the base station can change the DA for communication with the corresponding user equipment.

In the mean time, the base station signals broadcast information, which includes system parameter or system configuration information in common for the cell, midamble, etc. The midamble is a synchronization pattern inserted between data symbols to improve channel estimation, and is used to enhance a channel estimation function when symbols are transmitted to each antenna during communication. The midamble may be inserted to the data symbol transmitted through the downlink subframe periodically or non-periodically.

At this time, a method of configuring preamble, midamble, ranging and permutation and signaling broadcast information are determined depending on unique BS_ID per base station. If the DAS is used, the base station may configure broadcast information broadcasted by DAs in the same manner depending on signaling information shared between the DAs, or may the broadcast information in various manners to allow the respective DAs to signal independent broadcast information.

Hereinafter, a method of performing communication in a base station with a user equipment by scheduling a plurality of DAs in accordance with one embodiment of the present invention will be described in brief with reference to FIG. 5 to FIG. 8. In the following embodiment and drawings of the present invention, although the base station, which uses the DAS, includes a plurality of DAs, two DAs will be described for conciseness of description. Also, it is assumed that the user equipment, which performs communication with the base station through DA1, among a plurality of user equipments belonging to the DAS, is UE1 and the user equipment, which performs communication with the base station through DA2, is UE2. It is regarded that each user equipment is located within the DA zone of each DA.

FIG. 5 is a diagram illustrating an example of a procedure of performing communication between a base station and a user equipment in a DAS according to one embodiment of the present invention.

Referring to FIG. 5, if the base station according to one embodiment of the present invention broadcasts independent broadcast information (DA1_Specific Broadcast information and DA2_Specific Broadcast information) from DA1 zone and DA2 zone through each DA, UE1 and UE2 receive the broadcast information (S101). Each of the broadcast information can include the number of antennas constituting the respective DAs and/or index information. Also, since each of the broadcast information includes PA-preamble/SA-preamble, midamble, ABI (Advanced Broadcast Information), system configuration information, etc., each DA serves as the independent base station. At this time, the broadcast information can be included in the first OFDM symbol of each frame and/or the SFH as described in the frame structure of FIG. 3. Accordingly, the user equipment can recognize each DA as the independent base station and recognize each DA zone as a sub-cell, and can determine the base station as a PS (Processing Server) scheduling a plurality of base stations. After the UE1 and the UE2 perform the basic operation for communication such as synchronizing with the base station and receiving system information, the base station transmits unicast information (DA1_unicast information and DA2_unicast information), which includes AMAP-IE, MAC message, DL/UL data burst, etc., for actual data transmission and reception to each user equipment (S102). The unicast information is transmitted from the base station to each user equipment to perform specific data transmission and reception. The base station transmits unicast information dedicated for each user equipment through each DA. Afterwards, the base station and the user equipment can perform communication with each other.

According to one embodiment of the present invention as illustrated in FIG. 5, in view of a single user equipment, a plurality of DAs can be determined as a plurality of base stations and handover between the DA zones can be performed depending on movement of the user equipment. However, since the DAs are scheduled by the base station, communication throughput can be improved through cooperation between the DAs or scheduling for interference avoidance.

In the mean time, as an example of a DA scheduling method, the base station according to one embodiment of the present invention can classify broadcast information formation into DA specific broadcast information (DA_specific broadcast information) dedicated for each DA and DA common broadcast information (DA_common broadcast information) in common for DAs constituting each DA zone. In more detail, the base station can determine the DA specific broadcast information and the DA common broadcast information depending on features of the broadcast information to minimize interference occurring between the user equipments while simplifying a handover procedure based on movement of the user equipment. FIG. 6 is a diagram illustrating another example of a procedure of performing communication between a base station and a user equipment in a DAS according to one embodiment of the present invention. Referring to FIG. 6, the base station according to one embodiment of the present invention broadcasts the DA common broadcast information (DA_common Broadcast information) through each DA constituting each DA zone (S201). At this time, according to one embodiment of the present invention, the DA common broadcast information is defined as minimum information required for the user equipment to perform initial cell search for the base station. For example, the DA common broadcast information can include preamble used to synchronize between the base station and the user equipment, midamble used for channel estimation, and initial ranging configuration information. Accordingly, since the UE1 and the UE2 receive the same preamble, they can share bandwidth size, cell ID, and segment ID.

Next, the base station broadcasts the DA specific broadcast information (DA_specific Broadcast Information) dedicated for each DA through each DA zone (S202). In other words, the UE1 located within the DA 1 zone can receive DA1_specific broadcast information, and the UE2 located within the DA 2 zone can receive DA2_specific broadcast information. If the base station configures the DA common broadcast information as broadcast information used for initial cell search, the DA specific broadcast information can be configured as the other broadcast information except for the DA common broadcast information. For example, the DA specific broadcast information can include SFH, resource allocation permutation included in the ABI, UL control region information, etc. Also, the DA specific broadcast information can include information on the number of DAs (DA_number of antennas) constituting each DA zone. At this time, if a DA zone is configured by one DA, the information on the number of DAs may be the information on the number of antennas constituting the DA. If a DA zone is configured by a DA group that includes two or more DAs, the information on the number of DAs may be the information on a total number of antennas of the DA group. The user equipment can read midamble corresponding to a corresponding DA from various midambles broadcasted for channel estimation from the base station by receiving the information on the number of DAs.

After performing the basic operation for communication between the base station and the user equipment, such as synchronization, through broadcast information sharing, the base station transmits unicast information, which includes AMAP-IE, MAC message, DL/UL data burst, etc., to each user equipment (S203). The unicast information is transmitted from the base station to a specific user equipment to perform specific data transmission and reception. In FIG. 6, the UE1 receives DA1_unicast information transmitted through the DA1, and the UE2 receives DA2_unicast information transmitted through the DA2. Afterwards, the base station and the user equipment can perform communication with each other.

According to one embodiment of the present invention described with reference to FIG. 6, since the base station configures broadcast information for initial cell search as the DA common broadcast information to be shared by a plurality of DAs, each DA has the same ID. Accordingly, a plurality of user equipments can receive the DA common broadcast information regardless of the DA zone where the user equipment is located. In this case, since the respective user equipments cannot identify the plurality of DAs, they recognize that they receive a signal from the same base station. Also, even in the case that the DA zone is changed depending on movement of the user equipment within the cell zone, the handover procedure between the DA zones can be simplified. On the other hand, since the DA specific broadcast information is independently broadcasted for each of DAs, separate resource allocation permutation or UL control region can be allocated to each of the DAs. Accordingly, signaling between neighboring DAs or interference occurring due to repeated UL control region can be minimized. Also, since separate permutation is used for cooperation between the DAs, a multi-BS MIMO scheme can be used.

In FIG. 6, the DA common broadcast information and the DA specific broadcast information can be configured in various manners depending on the method of configuring DAs in a base station.

FIG. 7 is a diagram illustrating still another example of a procedure of performing communication between a base station and a user equipment in a DAS according to one embodiment of the present invention. In more detail, FIG. 7 illustrates an example of a procedure of broadcasting the same broadcast information in a base station through a plurality of DAs.

Referring to FIG. 7, the base station broadcasts the broadcast information in common for a plurality of DAs through the plurality of DAs (S301). At this time, unlike the aforementioned embodiment of FIG. 6, the broadcast information includes broadcast information belonging to the ABI or SFH in addition to the broadcast information for initial cell search. Accordingly, a plurality of user equipments located within the cell zone supported by the base station receive broadcast information from one or more neighboring DAs, share the same PA-preamble/SA-preamble, permutation, frequency allocation information, initial ranging configuration information, UL control region information, etc., and recognize each DA as an independent base station.

Next, the base station broadcasts information on the number of antennas within each DA zone through each DA (S302). The information on the number of antennas may be information (DA_specific antenna number information) configured for each of DAs. In this case, the information on the number of antennas may be regarded as the DA specific broadcast information in that the information on the number of antennas is independently broadcasted for each of the DAs. Alternatively, the information on the number of antennas may be a list of the information on the number of antennas, which includes the information on the number of antennas for each of the DAs. In this case, the information on the number of antennas may be regarded as the DA common broadcast information. Since the same list of the information on the number of antennas is broadcasted from all the DA zones, the UE1 and the UE2 can receive the list of the information on the number of antennas in FIG. 7. Each user equipment, which has received the same list of the information on the number of antennas, can obtain information on the number of DAs corresponding to a DA zone where each user equipment is located, from the list of the information on the number of antennas based on predetermined DA identification information included in the broadcast information received in the step S301.

Since the MIMO system is used in one embodiment of the present invention, one DA can configure the information on the number of antennas together with its neighboring DA. The step S302 of transmitting the information on the number of antennas may be broadcasted by being included in the broadcast information broadcasted in the step S301, or may be broadcasted separately as illustrated in FIG. 7.

Afterwards, the base station broadcasts midamble configured independently depending on the number of DAs through each DA (S303). The midamble broadcasted for measurement of antenna performance can be configured with different lengths or formats depending on the number of antennas constituting each DA. Also, the midamble may be inserted to the data symbol periodically (predetermined period) or non-periodically. The midamble is a kind of broadcast information in that it is broadcasted from the DA zone. However, the midamble may be regarded as the DA specific broadcast information in that it is configured independently depending on the information on the number of antennas for each DA.

At this time, the user equipment performs channel estimation at the DA, which performs signal transmission and reception with the user equipment, based on the information on the number of antennas for each DA as received or obtained in the step S302, and transmits the channel estimation information to the base station.

Next, the base station transmits unicast information (DA1_unicast information, DA2_unicast information, etc.) to each user equipment (S304), and performs communication with each user equipment.

Although not illustrated in FIG. 7, if the respective DAs are configured by two or more antennas or two or more DAs transmit the information on the number of antennas, the base station can designate the order of each DA to obtain performance of each antenna through the midamble configured depending on the number of antennas. The base station can signal the designated order of each DA to each user equipment as the unicast information. In other words, the base station can signal the order of antennas constituting DAs allocated to each user equipment or identification information such as index.

Also, although the steps S302 and S303 of broadcasting the information on the number of antennas and midamble are illustrated separately from the step S301 of broadcasting broadcast information in FIG. 7 for convenience of description, the steps S302 and S303 can be incorporated into the step of broadcasting broadcast information. Also, the information on the number of antennas and the midamble can be transmitted at a random time without restriction of a temporal order after the PA-preamble/SA-preamble are transmitted through the first OFDM symbol of each frame and/or the SFH. The midamble can be transmitted several times.

The user equipment, which has received the same broadcast information in accordance with one embodiment of the present invention, cannot identify each DA. However it is assumed that the user equipment can recognize one or more of all DAs if it receives a signal transmitted through each DA at a predetermined receiving rate or more, or if one or more DAs receive a signal transmitted from the user equipment at a predetermined receiving rate or more. For example, if the user equipment recognizes two or more DAs, the base station can transmit and receive a signal to and from the user equipment by cooperating the two or more DAs recognized by the user equipment, and can improve the receiving rate by combining the signals received through the respective DAs with one another. Alternatively, the base station can transmit a signal to the user equipment by performing beam-forming in such a manner that it transmits a signal through a predetermined number of antennas depending on the information on the number of antennas, which is previously transmitted. For example, if the base station broadcasts information on the number of antennas, indicating that the number of antennas of DA 1 is 4, and the user equipment located within a signal transmission range of the DA1 receives the information on the number of antennas, the UE1 can receive signals transmitted from the four antennas even though the base station transmits a signal to the UE1 through two or more DAs including the DA1. As a result, the base station can transmit the signal to the UE1 by performing beam-forming in such a manner that signals are transmitted from the four antennas.

FIG. 8 is a diagram illustrating further still another example of a procedure of performing communication between a base station and a user equipment in a DAS according to one embodiment of the present invention. In more detail, FIG. 8 illustrates another example of a procedure of broadcasting the same broadcast information in a base station through a DA group that includes one or more DAs.

Referring to FIG. 8, the base station broadcasts the broadcast information in common for a plurality of user equipments through a plurality of DA groups each of which includes one or more DAs (S401). Since the DA group has been described in FIG. 2, its description will be omitted for conciseness of description. Afterwards, the base station broadcasts information on the number of antenna groups for each DA group independently for each DA group (S402). In this case, the information on the number of antennas for DA group may be either the information on the number of antennas (DA group1_number of antenna, DA group2_number of antenna) configured for each DA group or a list of information on the number of antennas of DA group, which includes the information on the number of antennas of each DA group. If the base station broadcasts the list of information on the number of antennas of DA group, since all user equipments located within the cell can receive the same information list, the information on the number of antennas received by the UE1 and the UE2 may be the same information list unlike FIG. 8. In this case, predetermined identification information can be included in the broadcast information broadcasted in the step S401, so that the user equipment can obtain the information on the number of antennas of DA group associated with the DA zone where the user equipment is located.

In the mean time, before transmitting the midamble configured depending on the number of antennas of DA group, the base station can designate the order of each antenna or each DA at the DA group and transmit antenna order information (DA group1_order of antenna and DA group2_order of antenna) to the user equipment as unicast information (S403). The base station can share the antenna order information with a plurality of DAs while scheduling the Das, or signal the antenna order information to each user equipment as unicast information like FIG. 8. Afterwards, the base station broadcasts midamble (DA group1_midamble and DA group2_midamble) configured in various manners depending on the number of antennas of DA group (S404). The user equipment measures performance of each antenna in accordance with the antenna order based on the received midamble and transmits the measured result to the base station. In the mean time, the midamble can be inserted the symbol periodically in accordance with the antenna order. The user equipment, which performs channel estimation by receiving the midamble, can obtain the antenna order through the midamble corresponding to each antenna even without separately receiving the antenna order information.

Next, the base station transmits unicast information (DA group1_unicast information and DA group2_unicast information) to each user equipment (S405), and performs communication with each user equipment.

Although the steps S402 and S403 of broadcasting the information on the number of antennas and midamble are illustrated separately from the step S401 of broadcasting broadcast information in FIG. 8 for convenience of description, the steps S402 and S403 can be incorporated into the step of broadcasting broadcast information.

Also, the base station may designate the antenna order of the DA group by using frequency division or time division of the IEEE 802.16m (implicit information) without transmitting the information (explicit information) on each DA at the DA group or the antenna order as unicast information as illustrated in FIG. 8. For example, if the base station allocates four DAs for communication with a specific user equipment, a predetermined frequency domain is divided into four zones and each of the four zones are mapped into each DA. In this case, it is recognized that the DA group includes four DAs. The user equipment can obtain the antenna order of DAs constituting one DA group in accordance with the order of the divided frequency zones used by each DA even without separately receiving the DA antenna order information.

If the base station broadcasts the DA common broadcast information through the plurality of DAs as illustrated in FIG. 7 and FIG. 8, the plurality of DAs share the same permutation, and the UL control region between the respective DAs can be repeated. In this case, the base station can allocate different control channel indexes to neighboring user equipments within the same UL control region so as to avoid repetition of the UL control region, which occurs when data transmitted through each DA are allocated to the same resource unit between the DAs.

In the aforementioned embodiments of the present invention, information on the number of useful antennas can be included in the unicast information transmitted to each user equipment separately from the broadcast information broadcasted to include the information on the number of DAs. The useful antenna means the antenna that can be searched by the user equipment during communication with the base station. Since the user equipment located within the cell supported by the same base station is changed depending on its location within the cell, the distance with the base station antenna, etc., the number and index of useful antennas are also changed. For example, if several physical antennas use the same pilot pattern, since the corresponding user equipment can recognize that a signal is transmitted from one antenna, the number of useful antennas is one.

FIG. 9 is a block diagram illustrating a user equipment and a base station (FBS, MBS), in which the embodiments of the present invention can be carried out.

The user equipment is operated as a transmitter in an uplink, whereas the user equipment is operated as a receiver in a downlink. Also, the base station is operated as a receiver in the uplink, whereas the base station is operated as a transmitter in the downlink. In other words, each of the user equipment and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 9.

Referring to FIG. 9, the left side represents a structure of the transmitter while the right side represents a structure of the receiver. For description of the aforementioned embodiments, the transmitter represents an example of a base station which belongs to the DAs, and the receiver represents a random one of a plurality of user equipments located within the cell supported by the base station. Each of the transmitter and the receiver can include an antenna 300, 400, a receiving module 310, 410, a processor 320, 420, a transmitting module 330, 430, and a memory 350, 450.

The antenna 300, 400 includes a receiving antenna receiving a radio signal from the outside and forwarding the received signal to the receiving module 310, 410, and a transmitting antenna transmitting a signal generated by the transmitting module 330, 430 to the outside. If a MIMO function is supported, two or more antennas may be provided. The antenna 300 of the transmitter as illustrated in FIG. 9 represents one or more DAs selected from a plurality of DAs spaced apart from one another within a specific zone such as a cell supported by the base station, among all antennas of the base station, wherein the one or more DAs are selected based on the channel status during communication between the transmitter and the receiver, the location of the user equipment, the distance between the base station and the user equipment, etc. The selected one or more DAs can be changed depending on location change of the receiver.

The receiving module 310, 410 performs decoding and demodulation for the radio signal received from the outside through the antenna to recover original data and then forward the recovered data to the processor 320, 420. The receiving module and the antenna may be replaced with a receiving unit for receiving a radio signal, unlike FIG. 9.

The processor 320, 420 generally controls the whole operation of the transmitter or the receiver. In particular, the processor 320, 420 can perform a controller function for performing the aforementioned embodiments of the present invention, a medium access control (MAC) frame variable control function based on service characteristics and radio wave condition, a handover function, an authentication and encryption function, etc.

The transmitting module 330, 430 performs predetermined coding and modulation for data, which are scheduled from the processor 320, 420 and then transmitted to the outside, and then transfers the coded and modulated data to the antenna. The transmitting module and the antenna may be replaced with a transmitting unit for transmitting a radio signal, unlike FIG. 9.

The memory 340, 440 may store a program for processing and control of the processor 320, 420, or may perform a function for temporarily storing input/output data (in case of the user equipment, UL grant allocated from the base station), system information, station identifier (STID), flow identifier (FID), action time, etc. Also, the memory 340, 440 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 320 of the transmitter performs the whole control operation of the base station, and performs antenna resource allocation for selecting DA or DA group suitable for communication with the receiver. At this time, the processor 320 of the transmitter can allocate specific DA for communication to each user equipment or receive DA specific information from the receiver, i.e., the user equipment. Moreover, the processor 320 can include a broadcast information generating module 321 generating broadcast information. The broadcast information generating module 321 can generate broadcast information dedicated for each DA in accordance with one embodiment of the present invention. Alternatively, the broadcast information generating module 321 can respectively generate DA common broadcast information (DA_common broadcast information) in common for a plurality of DAs and DA specific broadcast information (DA_specific broadcast information) dedicated for each DA in accordance with another embodiment of the present invention. At this time, the broadcast information generating module 321 can allow each DA to broadcast information on the number of DAs, or can allow all DAs to broadcast a list of information on the number of DAs. Likewise, the broadcast information generating module 321 may control each DA group to broadcast information on the number of antennas of the corresponding DA group that includes one or more DAs, or control all DA groups to broadcast a list of information on the number of antennas of respective DA groups. The processor 320 can designate the order of antennas for DA or the order of antennas or DAs constituting DA group, and can transmit the antenna order information formation to the receiver as unicast information. Also, the processor 320 can configure midamble used for performance estimation of each antenna at different formats in accordance with the information on the number of DAs and broadcast the configured midamble from each DA zone through the transmitting module 330 periodically or non-periodically.

The receiver receives the broadcast information broadcasted from the transmitter through the receiving module 410, and receives the information on the number of antennas of DA group or DA used for communication with the receiver, the antenna order information, etc.

The processor 420 of the receiver also performs the whole control operation of the user equipment, and performs the whole operation required for communication such as synchronization with the base station based on the received broadcast information. Also, the processor 420 determines the number of useful antennas of the base station and/or index information, which can be searched by the user equipment, by measuring a downlink signal transmitted from the transmitter, and transmits the determined information to the transmitter through the transmitting module 430 simultaneously with or separately from other feedback information.

Moreover, the processor 420 can include a channel status estimation module 421 performing channel estimation or performance estimation of antennas by using the midamble for a specific DA associated with the receiver.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or can further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a BS, a UE, or other communication devices in a wireless communication system.

The invention claimed is:

1. A method of transmitting a signal from a base station to a user equipment in a distributed antenna system (DAS), the method comprising:

broadcasting distributed antenna (DA) common broadcast information, which includes information required for initial access, into a cell through each of a plurality of DA groups of the base station;

broadcasting DA specific broadcast information, which includes information on a number of antennas in each DA group, into the cell through each DA group of the plurality of DA groups of the base station, wherein each DA group includes one or more DAs; and broadcasting a midamble used for channel estimation through each DA group of the plurality of DA groups, wherein the midamble is configured for each respective DA group based on the number of antennas of the respective DA group.

2. The method of claim 1, wherein the DA specific broadcast information includes a list of information on the number of antennas dedicated to each DA group of the plurality of DA groups.

3. The method of claim 1, further comprising:

identifying a specific DA group associated with the user equipment; and transmitting a signal to the user equipment through the specific DA group using the information on the number of antennas broadcast in the DA specific broadcast information to the specific DA group.

4. The method of claim 3, further comprising transmitting information on an order of DAs of the specific DA group or an order of antennas to the user equipment.

5. The method of claim 1, further comprising receiving information on a result of channel estimation for a specific DA group associated with the user equipment, from the user equipment.

6. A method of receiving a signal in a user equipment from a base station in a distributed antenna system (DAS), the method comprising:

receiving distributed antenna (DA) common broadcast information, which includes information required for initial access, from the base station, wherein the base station includes a plurality of DA groups;

receiving DA specific broadcast information, which includes information on a number of antennas used for downlink transmission in a specific DA group associated with the user equipment, from the base station, wherein the specific DA group includes one or more DAs;

receiving a midamble configured based on the information on the number of antennas used for downlink transmission in the specific DA group, from the base station; and performing channel estimation using the midamble.

7. The method of claim 6, wherein the DA specific broadcast information includes a list of information on the number of antennas dedicated to each DA group of plurality of DA groups.

8. The method of claim 6, further comprising receiving information on an order of DAs of the specific DA group or an order of antennas from the base station.

9. The method of claim 6, further comprising transmitting a result of the channel estimation for the specific DA group to the base station.

10. A base station of a distributed antenna system (DAS), the base station comprising:

a plurality of distributed antenna (DA) groups, wherein each DA group includes one or more DAs;

a processor generating:

DA common broadcast information, which includes information required for initial access, DA specific broadcast information, which includes information on a number of antennas in each DA group, and a midamble used for channel estimation for each respective DA group by considering the number of antennas of the respective DA group;

a transmitting module broadcasting:

the DA common broadcast information into a cell through each of the plurality of DA groups, the DA specific broadcast information into the cell through each DA group of the plurality of DA groups, and the midamble into the cell through each DA group of the plurality of DA groups; and a receiving module receiving:

a result of the channel estimation, from the user equipment, for a specific DA group associated with the user equipment.

11. A user equipment of a distributed antenna system (DAS), the user equipment comprising:

a receiving module receiving:

distributed antenna (DA) common broadcast information, which includes information required for initial access, and DA specific broadcast information, which includes information on a number of antennas used for downlink transmission in a specific DA group associated with the user equipment, from a base station that includes a plurality of distributed antennas (DAs); and a processor performing channel estimation using a midamble of the specific DA group associated with the user equipment, the midamble being received through the receiving module, wherein the DA group includes one or more DAs.

12. The user equipment of claim 11, further comprising a transmitting module transmitting the result of the channel estimation for the specific DA group to the base station.

* * * * *